United States Patent
Matthews

(10) Patent No.: US 9,139,789 B2
(45) Date of Patent: Sep. 22, 2015

(54) METHOD OF PRODUCING A PETROLEUM SUBSTITUTE BY THE EXTRACTION OF WOOD OR TREE MATERIAL

(75) Inventor: Stephen Daniel Matthews, Navarre, FL (US)

(73) Assignee: Phytoleum Technologies Group, LLC, Navarre, FL (US)

(*) Notice: Subject to any disclaimer, the term of this patent is extended or adjusted under 35 U.S.C. 154(b) by 917 days.

(21) Appl. No.: 13/134,310

(22) Filed: Jun. 4, 2011

(65) Prior Publication Data

US 2012/0197049 A1    Aug. 2, 2012

Related U.S. Application Data

(63) Continuation-in-part of application No. 12/931,433, filed on Feb. 1, 2011.

(51) Int. Cl.

| C07C 1/00 | (2006.01) |
| C10L 1/04 | (2006.01) |
| C11B 13/00 | (2006.01) |
| C10G 1/02 | (2006.01) |
| C10G 1/04 | (2006.01) |

(Continued)

(52) U.S. Cl.
CPC ... C10L 1/04 (2013.01); C10G 1/02 (2013.01); C10G 1/04 (2013.01); C10G 1/042 (2013.01); C10L 1/1616 (2013.01); C11B 13/00 (2013.01); B02C 18/00 (2013.01); C10G 2300/1014 (2013.01); C10L 2200/0469 (2013.01); C10L 2290/28 (2013.01); C10L 2290/30 (2013.01); Y02E 50/10 (2013.01); Y02W 30/74 (2015.05)

(58) Field of Classification Search
CPC ............. C10G 1/04; C10G 2300/1011; C10G 2300/1014; B02C 18/00; Y02E 50/10

USPC .......... 44/307; 549/323; 210/634; 423/658.5; 23/293 R

See application file for complete search history.

(56) References Cited

U.S. PATENT DOCUMENTS

| 4,684,715 A | 8/1987 | Kay |
| 5,665,798 A | 9/1997 | Speaks |
| 5,698,667 A | 12/1997 | Speaks |

(Continued)

FOREIGN PATENT DOCUMENTS

| GB | 2063856 | * | 6/1981 |
| WO | WO 02/09893 | * | 2/2002 |

(Continued)

OTHER PUBLICATIONS

Pietarinen et al. "Knot wood and Bark . . . Waste Materials", J. Wood Sci(2006) 52:436-44.*

(Continued)

*Primary Examiner* — Nina Bhat
(74) *Attorney, Agent, or Firm* — Adams IP, LLC; J. Hunter Adams; Stephen Thompson

(57) ABSTRACT

A method for producing a petroleum substitute through a solvent extraction of woody tree material is provided. A raw biomass of woody tree material is processed into solvent-permeable wood particles and chips. Naturally occurring hydrocarbons suitable for use as a petroleum substitute are extracted by a mixture of polar and non-polar organic solvents in a counterflow operation. The extracted hydrocarbon oils are then separated from the solvent for use as a petroleum substitute, while the solvent is reused in the extraction process.

26 Claims, 16 Drawing Sheets

(51) Int. Cl.
*C10L 1/16* (2006.01)
*B02C 18/00* (2006.01)

(56) References Cited

U.S. PATENT DOCUMENTS

| | | | |
|---|---|---|---|
| 6,075,076 | A | 6/2000 | Speaks |
| 6,143,303 | A | 11/2000 | Janakiram et al. |
| 6,364,999 | B1 | 4/2002 | Speaks |
| 6,641,699 | B2 | 11/2003 | Speaks |
| 6,719,880 | B2 | 4/2004 | Speaks |
| 7,153,982 | B2 * | 12/2006 | Parhi et al. ............ 549/323 |
| 7,976,877 | B2 | 7/2011 | Willfor |
| 8,349,186 | B2 | 1/2013 | Herold |
| 8,404,355 | B2 | 3/2013 | Jansen |
| 8,465,559 | B2 * | 6/2013 | Guay et al. ............ 44/307 |
| 2003/0054055 | A1 | 3/2003 | Nakamoto |
| 2004/0219234 | A1 | 11/2004 | Nakamoto |
| 2004/0260105 | A1 | 12/2004 | Herold |
| 2007/0219141 | A1 | 9/2007 | Jones |
| 2008/0124414 | A1 * | 5/2008 | Willfor et al. ............ 424/771 |
| 2011/0129554 | A1 | 6/2011 | Maeda |
| 2011/0160442 | A1 * | 6/2011 | Pietarinen et al. ............ 530/507 |
| 2013/0276778 | A1 | 10/2013 | Jansen |

FOREIGN PATENT DOCUMENTS

| | | | |
|---|---|---|---|
| WO | WO 2005/047423 | * | 5/2005 |
| WO | WO 2010/000927 | * | 1/2010 |

OTHER PUBLICATIONS

S. Willfor et al. "Extractives in Norway Spruce Knots", Hozfoschung/vol. 57/ 2003.*

* cited by examiner

Eucalyptus globulus

SOLVENT PERMEABLE PARTICLE CREATION

A. RAW WOODY BIOMASS

B. DELIMBING (CHAIN FLAIL)

DEBARKED LOGS EXIT CHAIN FLAIL

LIMBS, BARK, LEAVES COLLECTED

SOLVENT PERMEABLE PARTICLE CREATION

C. DEBARKED LOGS (LONGWOOD)

D. PARTICLE FORMATION (DRUM CHIPPER)

CHIPS ALONG THE GRAIN

E. SOLVENT PERMEABLE PARTICLES (WOOD CHIPS)

SOLVENT PERMEABLE PARTICLE CREATION

F. LIMBS, BARK LEAVES

G. PARTICLE FORMATION (DRUM CHIPPER)

H. SOLVENT PERMEABLE LEAFY WOOD PARTICLES

SOLVENTS

HEXANE

ACETONE

ETHANOL

BUILDING BLOCKS

ISOPRENE

2-METHYL- 2-BUTENE

2-METHYL- 1-BUTENE

NAPHTHA

HEPTANE

ALPHA PINENE

BETA PINENE

GREASE FRACTION

FARNESENE  C15

PHYTANE  C20

SQUALENE  C30

TAR FRACTION

BETA-CAROTENE

LUP-20(29)-EN-3-ONE

TAR FRACTION

CHLOROPHYLL A

METHOD OF PRODUCING A PETROLEUM SUBSTITUTE BY THE EXTRACTION OF WOOD OR TREE MATERIAL

RELATED APPLICATIONS

The present application is a continuation in part of prior application Ser. No. 12/931,433, filed Feb. 1, 2011, currently pending. This prior application is incorporated herein by reference, including the specification.

FIELD OF THE INVENTION

The present invention refers generally to a method of producing a petroleum substitute from renewable, woody tree-based sources and, more specifically, to a method of producing a petroleum substitute comprised of an organic solvent extract of a woody tree biomass.

BACKGROUND

Hydrocarbons are the source of many fuels and chemical feedstocks used for industry and commerce in the world. Petroleum is the predominant source of these hydrocarbons. This petroleum is sourced from geological deposits located beneath the surface of the earth. These hydrocarbons are then refined and reformed and used as source chemicals for fuels and feedstocks. Traditionally these hydrocarbons are sourced from geological resources. However, hydrocarbons can be found in most living organisms. As hydrocarbons are produced by living organisms, these organisms can be cultivated and processed for use as source hydrocarbons. The ideal organisms for use as petroleum substitutes use energy from the sun to fully reduce carbon dioxide into source hydrocarbons.

Higher plants produce hydrocarbon compounds composed primarily of isoprenoids, which are organic compounds comprised of two or more hydrocarbon subunits each having five carbon atoms. These isoprenoids are often in the form of hydrocarbon terpenes made from pentene subunits primarily comprised of 2-methyl-2-butene as well as 2-methyl-1-butene. Most plants produce these isoprenoid terpenes in small amounts and utilize them to form more complex biochemicals. However, some types of plants produce terpenes as a major metabolic product. In particular, some trees and shrubs of the Pinaceae, Myrtaceae, Styracaceae, and Burseraceae families have very high levels of hydrocarbons present within their tissues.

Prominent examples include pine and *eucalyptus* trees. From antiquity to early modern times, hydrocarbons removed from pines were used as tar for naval stores or turpentine for cleaning solvents. Myrtles generally yield more oxygenated and pleasant smelling hydrocarbons that are used in cough drops and vapor rubs containing *Eucalyptus*. In addition, *styrax* and myrrh tree species have been associated with resinous perfumes and incense since Biblical times.

Pine and *eucalyptus* trees contain particularly high levels of hydrocarbons having relatively low molecular weights. The hydrocarbons found in the woody tree material of these species are mainly comprised of oligomerized pentenes formed from isoprene-derived pentene subunits 2-methyl-2-butene and 2-methyl-1-butene. These pentenes are then constructed via cellular metabolism into other chemicals such as hormones, energy stores, or defense chemicals. These relatively low molecular weight oligomerized pentene metabolites are typically comprised of only a few monomers. Thus, the woody tree material from these species has the potential for economical production of a petroleum substitute.

Attempts in the prior art to produce a petroleum substitute from woody tree material have focused on enzyme and pyrolysis-based methods for breaking down a biomass of woody tree material to convert its energy into fuel feedstocks. Two main classes of fuel feedstocks have been produced: cellulosic ethanol and bio-crudes. Cellulosic ethanol has been derived from wood by breaking the cellulosic material down into simple sugars to be fermented by yeast or bacteria into ethanol. Bio-crudes have largely been produced by pyrolyzing woody tree material in order to break lignin and cellulose into smaller molecules. Bio-crudes generally have a very high oxygen content for a petroleum substitute due to the high oxygen content of cellulose and lignin in the woody biomass itself.

However, the prior art suffered from inefficiencies due to the energy costs required to achieve pyrolysis, the complexities of breaking down the woody tree material enzymatically, and the costs to derive the enzymes and provide an optimal environment required for processing the biomass into a fuel feedstock. In addition, the utilization of fuel feedstocks derived from woody tree material has been problematic as wood-derived feedstocks have significant chemical differences as compared to petroleum-derived feedstocks. Furthermore, converting wood into ethanol or bio-crude is a generally inefficient process that destroys and consumes the wood leaving little to no potential aftermarket for the processed biomass of wood.

Accordingly, a need exists in the art for a method of producing a petroleum substitute comprised of a hydrocarbon composition that can be produced from renewable woody tree-based sources in a simple and more economical manner than is currently achievable.

SUMMARY

A preferred embodiment of the invention is directed generally to a method of producing a petroleum substitute from renewable woody tree-based sources. Furthermore, a preferred embodiment of the invention is directed more specifically to a method of producing a petroleum substitute comprised of an organic solvent extract of a woody hydrocarbon-bearing tree or shrub that can produce significant quantities of liquid terpenes. In a preferred embodiment, the woody tree material is derived from a pine or *eucalyptus* tree, or combination thereof Once the hydrocarbons are extracted from a biomass of the woody tree material, the extracted hydrocarbons are separated from the solvent and can be used as a petroleum substitute or a feedstock for various petrochemical products. In addition, the resulting petroleum substitute product is compatible with existing means of distribution of liquid petroleum-based products. The extracted hydrocarbon composition may also be used to augment existing petroleum-based fuels.

The solvent extract is prepared by first applying compressive and shearing forces to a raw biomass of woody tree material. The woody tree material utilized may be comprised of logs, limbs, tree barks, or leaves. In a preferred embodiment, the compressive and shearing forces are applied to the tree material using drum or disk wood chipping equipment. Applying these forces creates wood particles from which hydrocarbons may be extracted.

Next, the hydrocarbons are extracted from the biomass of wood particles by conveying the particles in a direction that is countercurrent to a flow of organic solvent in a continuous system. The organic solvent flow is comprised of a mixture of at least two organic solvents. The mixture of solvents is comprised of at least one non-polar solvent and at least one polar solvent. The polar organic solvent must be soluble in both water and in the non-polar organic solvent used in the solvent extraction process. In a preferred embodiment, the non-polar solvent is hexane and the polar solvent is acetone. In an alternative embodiment, the polar solvent is ethanol.

A liquid mixture comprised of the solvent mixture and the extracted hydrocarbons is then recovered, along with some water and water-soluble components extracted from the woody tree material. Thus, the recovered liquid is comprised of two phases: an aqueous phase comprised of water and water-soluble components and an organic phase comprised of solvent and extracted hydrocarbons. The two phases are then separated. In a preferred embodiment, the phase separation is achieved through centrifugation.

Finally, the extracted hydrocarbons are separated from the solvent mixture to produce the organic solvent extract. In a preferred embodiment, this separation is achieved through distillation or evaporation. If desired, the solution of extracted hydrocarbons may then be further separated into its constituent components in a fractional distillation unit.

This method is most effective when applied to woody hydrocarbon-bearing trees or shrubs that can produce significant quantities of liquid terpenes. In the preferred embodiment wherein the method is applied to pine or *eucalyptus* tree material, the resulting solvent extract is generally comprised of hydrocarbons having relatively low molecular weights. The hydrocarbons found in pine and *eucalyptus* tree material are mainly comprised of oligomerized pentenes formed from isoprene-derived pentene subunits 2-methyl-2-butene and 2-methyl-1-butene. Because many of the chemical compounds found in the extract are biologically synthesized from pentenes, the number of carbon atoms found in these chemicals is often a multiple of five, although hydrocarbons having odd-numbered carbon atoms are also common in the extract. These relatively low molecular weight hydrocarbons have desirable properties for the petroleum industry. They can be utilized as plastic polymer precursors or in the production of gasoline additives. In addition, they can be directly distilled and utilized as a fuel or as a feedstock in the production of various petrochemical products.

The solvent extract of the woody tree material is comprised of three fractions: a naphtha fraction, a grease fraction, and a tar fraction. The fraction having the lowest boiling point is the naphtha fraction. The naphtha fraction is comprised primarily of alpha pinene, beta pinene, and heptane, but also includes various monoterpenes (terpenes having ten carbon atoms) such as limonene, 2,6-dimethyl-2,6-octadiene, and 2,7-dimethyl-2,6-octadiene, as well as other similar pentene oligomers. Pinenes are cyclical monoterpenes comprising turpentine.

The naphtha fraction is the most abundant fraction of the solvent extract and also the most commercially important fraction. The naphtha fraction is a clear to pale yellow liquid having a high vapor pressure. This fraction may include compounds having boiling points that can range from about 30 to 200 degrees Celsius. However, in most instances the majority of the liquids in the naphtha fraction have a boiling point in the range of about 150 to 180 degrees Celsius. In a preferred embodiment, the majority of the liquids in this fraction have a boiling point of about 150 to 160 degrees Celsius.

The second fraction is the grease fraction, which is a light to golden brown liquid comprised primarily of squalene with lesser concentrations of farnesene and phytane. The grease fraction will also include any diterpenes (terpenes having twenty carbon atoms) that may be present in the extract, as well as other similar pentene oligomers.

The final fraction, which has the highest boiling point, is the tar fraction. This fraction holds all of the solid and semi-solid hydrocarbons and is usually dark green due to the presence of chlorophyll. This fraction is comprised of rubbers, carotenes, chlorophyll, larger terpenoid molecules, and other similar pentene oligomers. Ketone groups are also present in this fraction in sterols as well as in the chlorophyll. The tar fraction also contains some alcohol compounds.

The organic solvent extract of pine or *eucalyptus* woody tree material serves as an excellent substitute for petroleum sourced from geological deposits. However, a petroleum substitute may be produced by applying the method to any hydrocarbon-bearing woody tree material.

Accordingly, an object of the present invention is to provide a method for producing a hydrocarbon composition comprised of an organic solvent extract of a woody hydrocarbon-bearing tree or shrub that can be used as a petroleum substitute or as a feedstock in the production of various petrochemicals. Another object of the present invention is to provide a method for producing a hydrocarbon composition comprised of an organic solvent extract of a woody hydrocarbon-bearing tree or shrub that can be used to augment existing petroleum-based fuels. Yet another object of the present invention is to provide a method for producing a petroleum substitute from renewable woody tree-based sources that are sufficiently high yielding in hydrocarbons to be economically viable. Another object of the present invention is to provide a method for producing a petroleum substitute comprised of an organic solvent extract of pine or *eucalyptus* tree material. Furthermore, an object of the present invention is to provide a method for producing a petroleum substitute that is compatible with existing means of distribution of liquid petroleum-based products.

DESCRIPTION OF THE DRAWINGS

These and other features, aspects, and advantages of the present invention will become better understood with regard to the following description, appended claims, and accompanying drawings where:

DETAILED DESCRIPTION

In the Summary above and in this Detailed Description, and the claims below, and in the accompanying drawings, reference is made to particular features, including method steps, of the invention. It is to be understood that the disclosure of the invention in this specification includes all possible combinations of such particular features. For example, where a particular feature is disclosed in the context of a particular aspect or embodiment of the invention, or a particular claim, that feature can also be used, to the extent possible, in combination with/or in the context of other particular aspects of the embodiments of the invention, and in the invention generally.

The term "comprises" and grammatical equivalents thereof are used herein to mean that other components, ingredients, steps, etc. are optionally present. For example, an article "comprising" components A, B, and C can contain only components A, B, and C, or can contain not only components A, B, and C, but also one or more other components.

Where reference is made herein to a method comprising two ore more defined steps, the defined steps can be carried out in any order or simultaneously (except where the context excludes that possibility), and the method can include one or more other steps which are carried out before any of the defined steps, between two of the defined steps, or after all the defined steps (except where the context excludes that possibility).

Turning now to the drawings, FIGS. 1-13 illustrate preferred embodiments of the invention. A preferred embodiment of the invention is directed generally to a method of producing a petroleum substitute from renewable plant-based sources through a solvent extraction process. More specifically, a preferred embodiment of the invention is directed to a method of producing a petroleum substitute comprised of an organic solvent extract of a woody hydrocarbon-bearing tree or shrub capable of producing significant quantities of liquid terpenes such that the process of extracting hydrocarbons from the woody tree material is economically viable.

Figure 1:
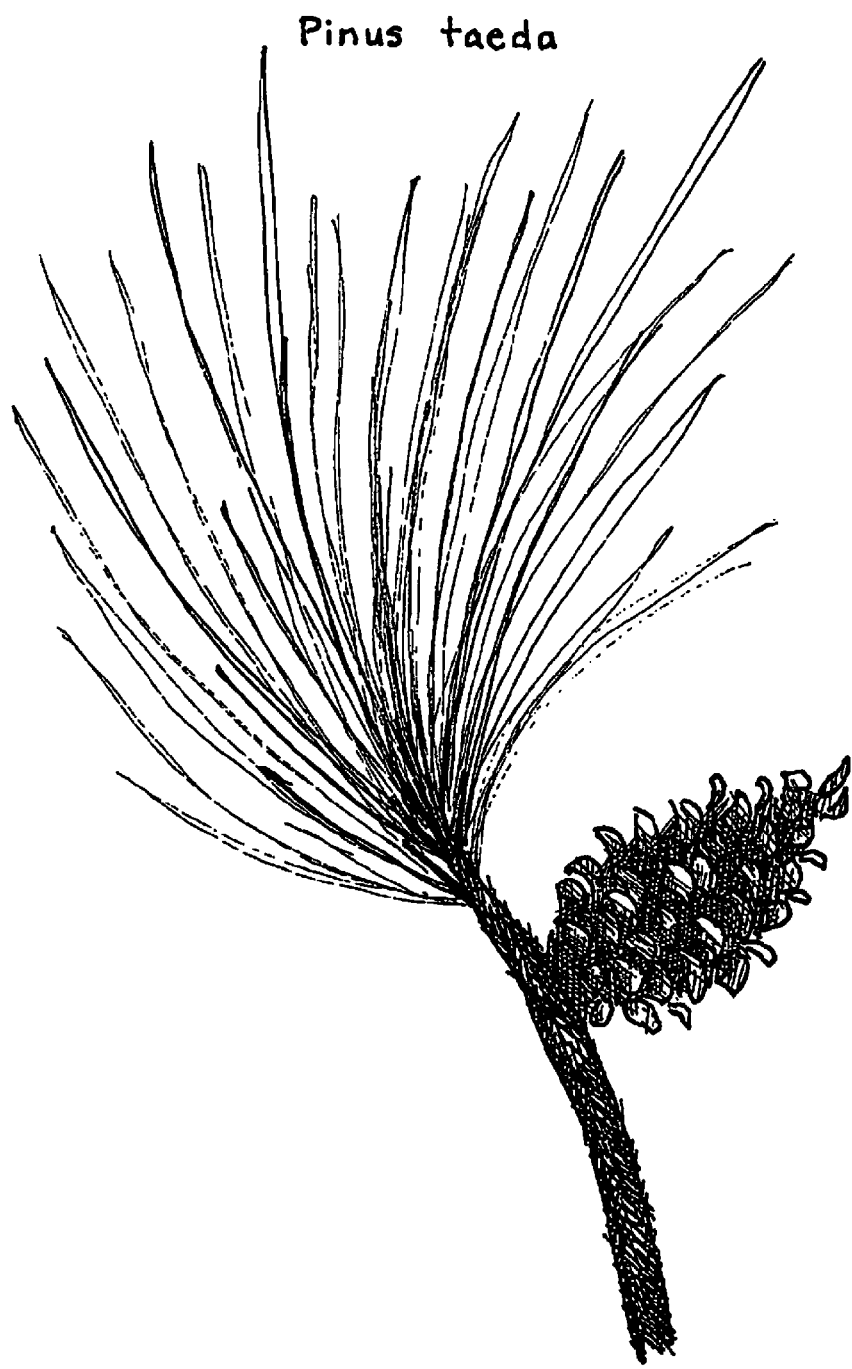
FIG. 1 is a depiction of pine tree material.
Figure 2:
FIG. 2 is a depiction of *eucalyptus* tree material.

In a preferred embodiment of the invention, the source of the woody tree material is a tree species from the Pinaceae or Myrtaceae family. Preferably, the source of the woody tree material is comprised of at least a portion of tree material from a pine or *eucalyptus* tree. These species contain relatively large quantities of relatively low molecular weight hydrocarbons. FIGS. 1 and 2 illustrate typical examples of pine tree and *eucalyptus* tree material, respectively.

The hydrocarbons are extracted from a biomass of the pine or *eucalyptus* woody tree material using an organic solvent. Due to the physical properties of the woody tree material, the solvent extraction process utilizes a mixture of organic solvents comprised of at least one non-polar solvent and at least one polar solvent. Once the hydrocarbons are extracted from a biomass of the woody tree material, the extracted hydrocarbons are separated from the solvent and can be used as a petroleum substitute or a feedstock for various petrochemical products. In addition, the resulting petroleum substitute product is compatible with existing means of distribution of liquid petroleum-based products. The extracted hydrocarbon composition may also be used to augment existing petroleum-based fuels.

Figure 3:
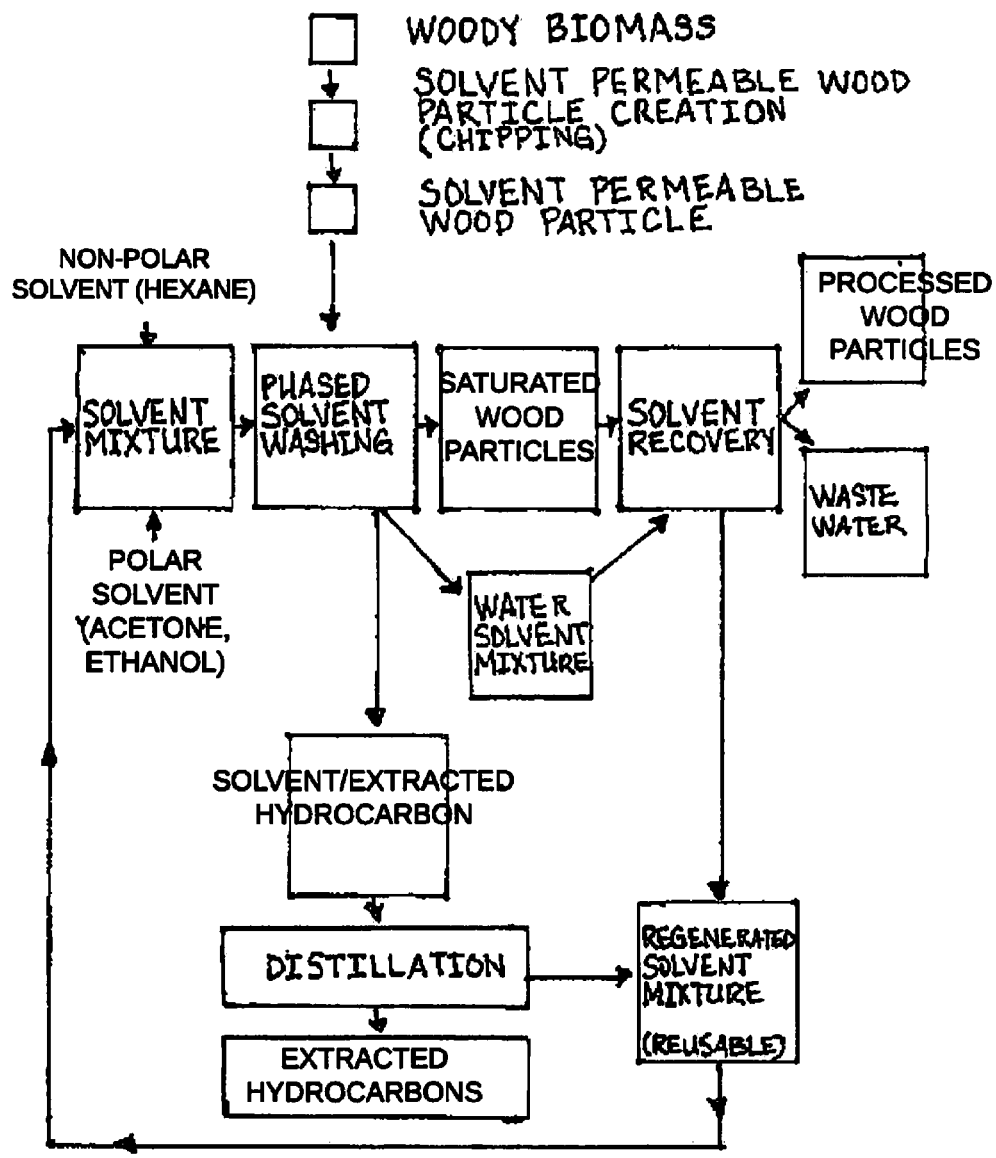
FIG. 3 is a flow chart of the overall process of converting woody tree material into a solvent extract of the tree material.

FIG. 3 provides a schematic diagram of the overall process for extracting hydrocarbons from the woody tree material. This process generally comprises a countercurrent, multi-phase solvent wash of a processed biomass of the tree material in order to extract the hydrocarbons from the tree material, followed by separation of the extracted hydrocarbons from the solvent and from a water phase produced from the biomass. The recovered hydrocarbons may then be used as a petroleum substitute or chemical feedstock.

Figure 4A:
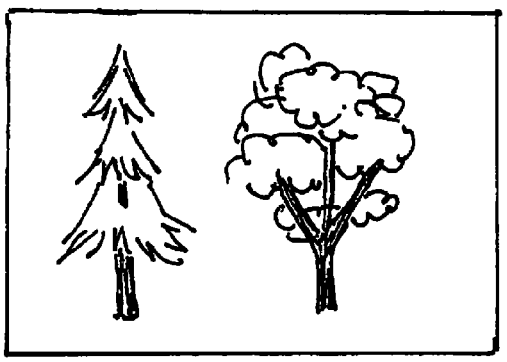
FIGS. 4A, 4B, and 4C, are illustrated block diagrams of a preferred embodiment of a process for making a plurality of solvent-permeable wood particles from a raw biomass of woody tree material.
Figure 4A:
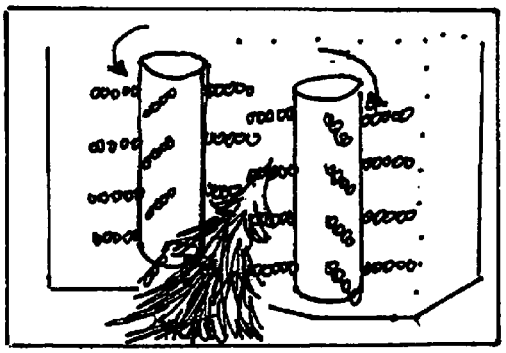
Figure 4B:
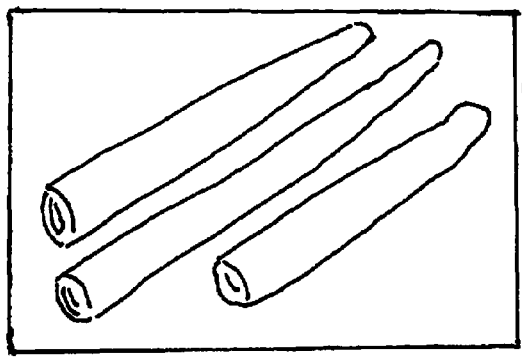
Figure 4B:
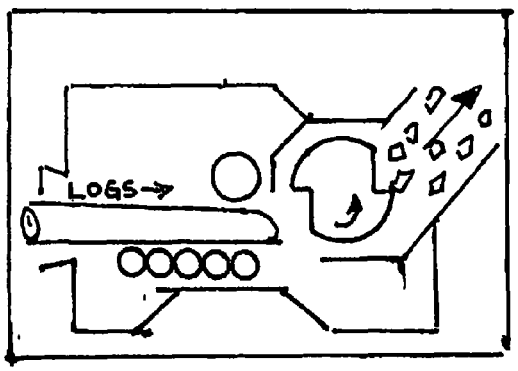
Figure 4B:
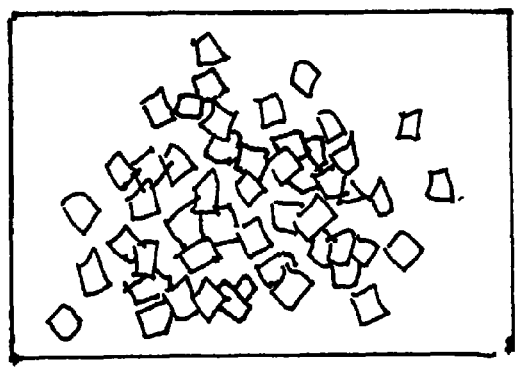
Figure 4C:
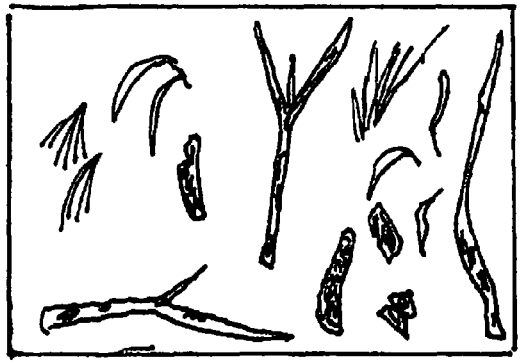
Figure 4C:
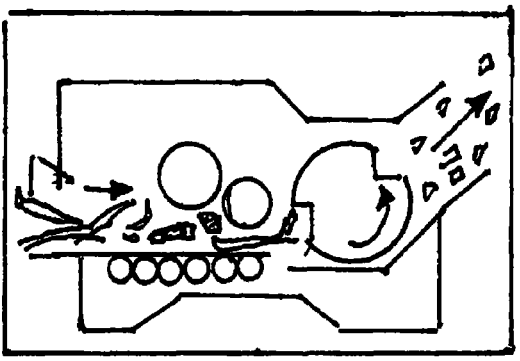
Figure 4C:
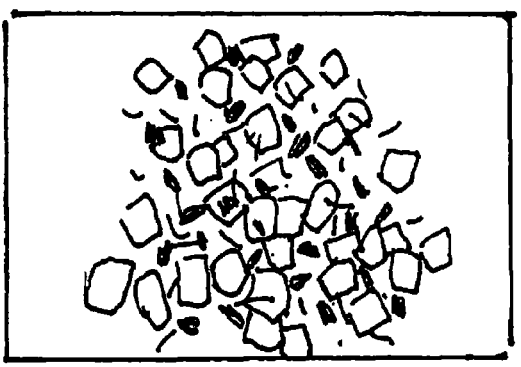

The first step in the process, as illustrated in FIGS. 4A, 4B, and C, is to produce a plurality of solvent-permeable wood particles from a raw biomass of woody tree material. The wood particles will then be used in a continuous solvent extraction process. Formation of the solvent-permeable wood particles will allow for efficient flow of solvent through the woody tree material to extract hydrocarbon oils. The particles are produced by the application of compressive and shearing forces to the raw biomass of woody tree material.

As illustrated in FIG. 4A, the process of creating solvent-permeable wood particles begins with harvesting whole trees. The whole trees are typically then delimbed and debarked using a chain flail. This process produced two streams: debarked logs (commonly called "longwood") and a stream of limbs, barks, and leaves. All of these components of the tree are suitable for the solvent extraction process of the present invention. The two streams may be combined before the solvent extraction process or may be used separately for solvent extraction. In a preferred embodiment of the invention, the stream of debarked logs is kept separate for the solvent extraction process. The reason is that wood particles derived from longwood may be used in various pulp and paper processes after the naturally occurring hydrocarbons have been extracted from the particles. For instance, the wood particles derived from longwood may be used in paper production or chipboard manufacturing, among other uses. However, particles derived from the smaller branches and limbs of the tree, as well as the bark and leaves, are generally not suitable for pulp and paper processes.

Once the trees have been delimbed and debarked, the woody tree material comprising the logs, limbs, barks, leaves, or any combination thereof, is subjected to compressive and shearing forces. In a preferred embodiment, the compressive and shearing forces are applied to the tree material using drum or disk wood chipping equipment. The woody tree material is fed into a drum or disk wood chipper in order to produce wood chips and other woody particles that are relatively small in size. Particle size reduction in the wood chipper will result in efficient hydrocarbon extraction from the particles by providing a greater surface area for the solvent to penetrate the tree material, as well as an efficient flow of solvent through the particles. In a preferred embodiment, the wood of the tree is cleaved along the vascular tissue comprising the grain of the wood.

Figure 6:
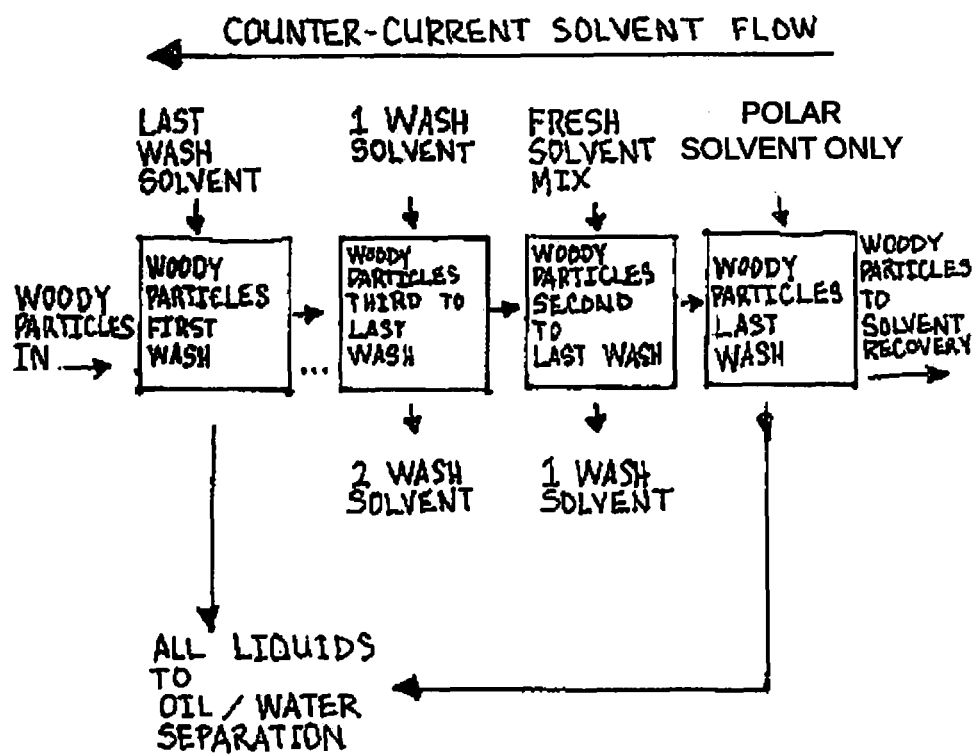
FIG. 6 is a flow chart showing a preferred embodiment of a multi-phase solvent wash process utilizing a polar and a non-polar organic solvent.

Thus, the final product of this first step is a plurality of solvent-permeable wood particles. The processed wood particles are then ready for use in the solvent extraction process. As illustrated in FIG. 6, the solvent extraction process is a continuous, multi-phase solvent wash process comprised of a series of individual solvent wash units. FIG. 6 illustrates an exemplary embodiment of the present invention having four individual solvent wash units. However, it should be understood by one skilled in the art that the present invention may be comprised of any number of individual wash units and still fall within the scope of the invention. The number of wash units utilized in a particular application would be selected based on the hydrocarbon content of the woody tree material, the size of the wood particles, the desired level of extraction from the wood particles, the desired throughput speed of the wood particles through the solvent wash units, and the number and types of different solvents utilized.

Figure 5:
FIG. 5 depicts preferred polar and non-polar organic solvents for use in the solvent extraction process.
Figure 5:
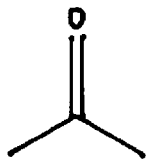
Figure 5:

FIG. 5 illustrates preferred solvents that may be utilized in the present invention. The solvent utilized in the solvent extraction process is an organic solvent comprised of a mixture of at least two organic solvents. The mixture of solvents is comprised of at least one non-polar solvent and at least one polar solvent. The polar organic solvent must be soluble in both water and in the non-polar organic solvent used in the solvent extraction process. The reason is that the solvent extraction process produces an organic liquid phase as well as an aqueous phase. The polar solvent should be soluble in both phases. In addition, the polar solvent should have a boiling point below that of water. Further, the polar solvent should be free from high percentage water azeotropes in which significant portions of the water would be distilled with the solvent. This characteristic is important in order to avoid high heat consumption per unit of material arising from the phase change of water.

The polar solvent is necessary in the present invention in order to facilitate sorption of the non-polar solvent into the wood particles. The polar solvent allows for the non-polar solvent to penetrate pockets of water in the vascular tissue of the wood particles in order to absorb the hydrocarbons naturally present in the wood particles. If a polar solvent were not used in combination with the non-polar solvent, the wood particles would need to be reduced further in size in order for the non-polar solvent to effectively penetrate the wood particles to have an efficient extraction process. In such a case, the raw woody tree material would require more processing to reduce the size of the particles. In addition, the smaller particle size would limit the aftermarket applications with respect to the wood particles derived from longwood. Thus, utilizing a polar solvent in combination with a non-polar solvent allows for effective solvent extraction of wood particles having a wide range of sizes. This solvent mixture allows for larger wood chips to be used in the extraction process, though the present invention may also utilize smaller particles such as sawdust-sized particles. In a preferred embodiment, the raw woody tree material is reduced in size to the largest particle size feasible for effective extraction of hydrocarbons from the particles. Maximizing the particle size also maximizes the potential aftermarket applications of the wood particles.

In a preferred embodiment, the non-polar solvent is hexane and the polar solvent is acetone. In an alternative embodiment, the polar solvent is ethanol. Each of these polar solvents provide for effective hexane sorption into the wood particles and thus effective solvent extraction of hydrocarbons from the wood particles. In addition, both polar solvents form a depressed boiling point azeotrope with water, which helps to reduce energy requirements during later solvent distillation. However, in alternative embodiments, the solvent used may be comprised of any combination of organic solvents comprised of at least one non-polar solvent and at least one polar solvent. In addition, different solvent combinations may be used sequentially in each individual wash unit if a sequentially selected removal of hydrocarbon oil constituents is desired.

As illustrated in FIG. 6, each solvent wash unit is comprised of a continuous system of washing solvent through the wood particles. The wood particles enter each solvent wash unit and are conveyed along a length of a solvent washing area. The particles are conveyed in a direction countercurrent to the flow of solvent. In a preferred embodiment, the wood particles are conveyed upward on an incline along the length of the solvent washing area, and the solvent flows downward through the particles by gravity. Thus, in countercurrent operation of the wash unit, fresh solvent entering the unit first contacts wood particles that have already been conveyed along a majority of the length of the solvent washing area. Conversely, the fresh wood particles entering the wash unit first contact "dirty" solvent that has already flowed through wood particles along a majority of the length of the solvent washing area. This countercurrent configuration produces a solvent/oil gradient along the length of the solvent washing area in which the extraction process occurs. This gradient allows for the most economical level of solvent use in extracting the hydrocarbon oils. Lower volumes of solvent use not only minimizes solvent loss but also decreases the amount of energy required per unit mass of woody tree biomass needed to recover the solvent following the extraction process.

In a preferred embodiment, the wood particles are conveyed countercurrent to the solvent by a rotary screw or a conveyor belt as the solvent flows by gravity. In alternative embodiments, countercurrent flow between the wood particles and the solvent may be achieved by other means. For instance, pressurized flow and/or other types of mechanical forces may be utilized to force countercurrent flow.

As illustrated in FIG. 6, fresh solvent first enters the second to last solvent wash unit. The fresh solvent enters this wash unit at the end of the solvent washing area nearest the outflow of wood particles. The solvent flows countercurrent to the wood particles along the length of the solvent washing area. The dirty solvent from the second to last wash unit is then used as the new solvent in the previous wash unit, while the dirty solvent from this unit is used as the new solvent in the next previous unit, and so on. As many units as necessary may be utilized to achieve the desired level of hydrocarbon oil extraction from the wood particles.

In a preferred embodiment, as illustrated in FIG. 6, the final solvent wash unit utilizes only a polar solvent, which is preferably the same polar solvent used in the mixture of polar and non-polar solvents used for the extraction process. As noted above, this solvent is preferably comprised of acetone or ethanol. Utilizing only the polar solvent in the final wash unit will help to remove any of the remaining non-polar solvent and hydrocarbons extracted from the wood particles. Thus, the final wash using only the polar solvent will help to maximize recovery of the extracted hydrocarbons from the wood particles.

The multi-phase washing process as described above continues until the solvent mixture reaches the first wash unit. The dirty solvent from the first wash unit is collected as washer outflow from the unit at the end of the solvent washing area nearest the inflow of fresh wood particles into the first unit. However, the liquid stream comprised of the dirty solvent is also comprised of water and water solubles extracted from the woody tree material along with the hydrocarbons. Thus, this liquid stream contains both an organic phase comprised of solvent and extracted hydrocarbons, as well as an aqueous phase. The liquid stream comprised of two phases is collected from the first solvent wash unit and sent to a water/oil separator unit comprising at least one centrifuge, as discussed below.

In an alternative embodiment, fresh solvent may be introduced into each wash unit in order to increase the extraction rate of hydrocarbons from the wood particles. The dirty solvent outflow from individual units may then be combined before all of the recovered liquids from the extraction process are sent to the water/oil separator unit.

Figure 7:
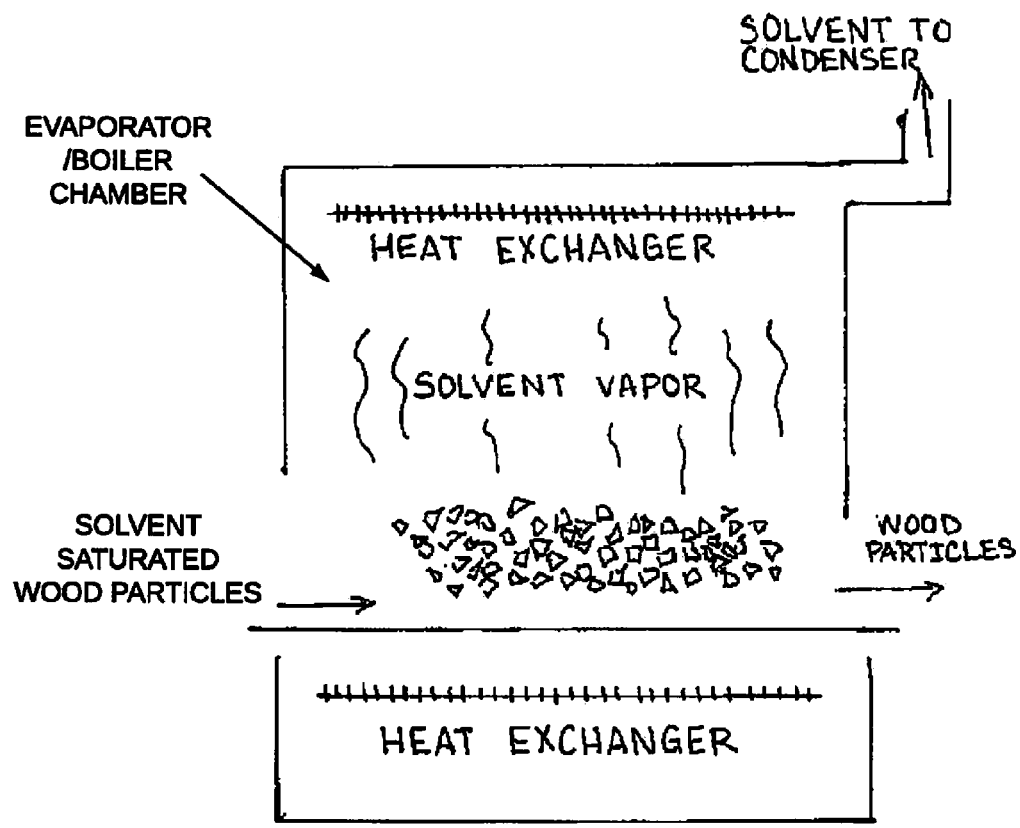
FIG. 7 is a side plan view of a preferred embodiment of the invention depicting a solvent recovery unit.

After the wood particles have been processed through all of the solvent wash units, the particles are then conveyed to a solvent recovery unit as illustrated in FIG. 7. The purpose of the solvent recovery unit is to recover any solvent that may remain in the processed wood particles so that the solvent can be recovered and reused in the extraction process. In addition, by recovering the solvent the unit reduces the potential discharge of solvent or any other waste chemicals from the processed wood particles to levels that are in compliance with environmental regulations, thereby making the wood particles suitable for discharge to the environment.

The solvent recovery unit utilizes heat to evaporate a substantial portion of any remaining solvent from the processed wood particles until the particles are suitable for discharge. The wood particles are conveyed into an evaporator/boiler chamber, as illustrated in FIG. 7. The unit is comprised of at least one heat exchanger or one boiler located within the chamber. The heat exchanger or boiler heats the wood particles and causes a substantial portion of any remaining solvent to evaporate. In a preferred embodiment, the unit is operated at atmospheric pressure. However, the unit may be operated under a partial vacuum in order to aid the evaporation process. The solvent vapor is then recovered and condensed so that it can be reused in the solvent extraction process. The final product of the solvent recovery unit is a plurality of wood particles that are substantially free of solvent and any other waste chemicals that may be present in the particles following the extraction process. The size and operating conditions of the solvent recovery unit are selected based on desired throughput of wood particles and the types and amounts of solvent present in the processed particles. The wood particles derived from longwood may then be used in various pulp and paper processes to produce paper, chipboard, or other similar products.

Figure 8:
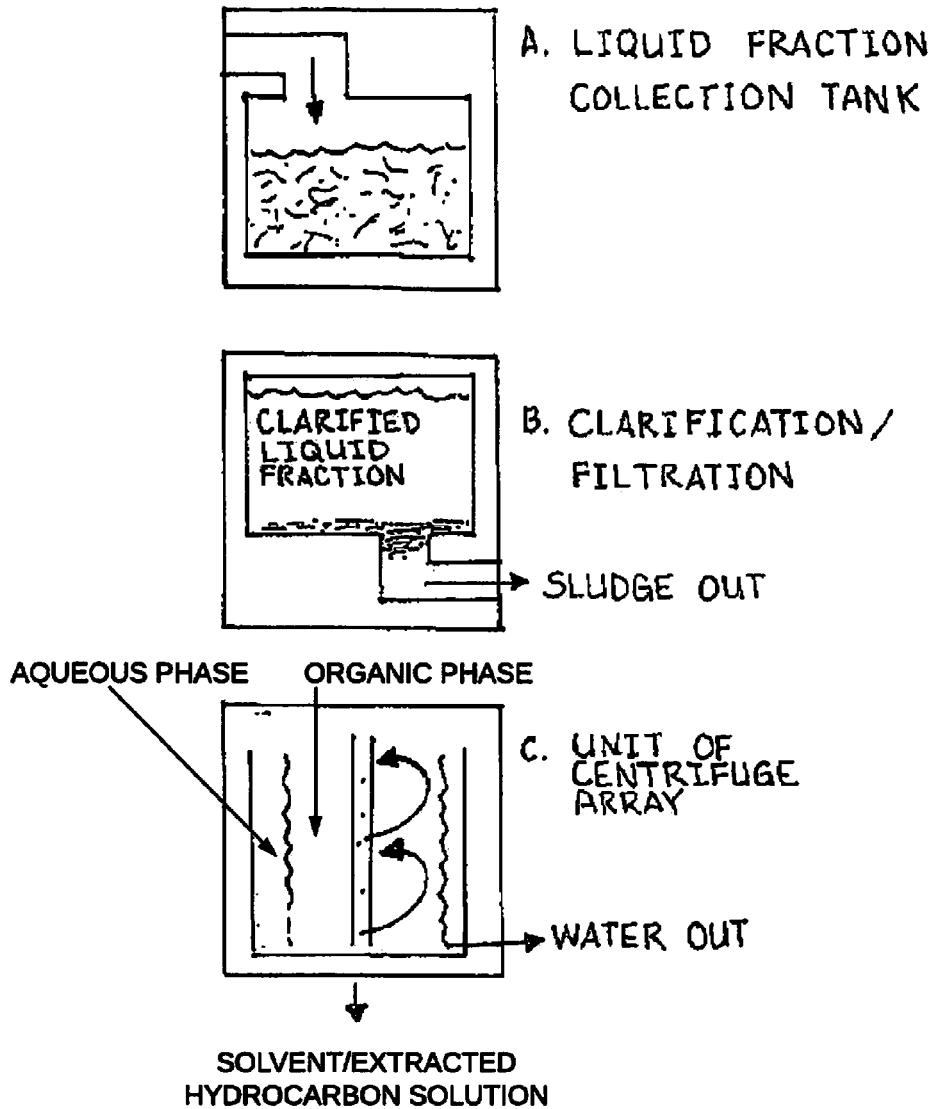
FIG. 8 is an illustrated block diagram of a preferred embodiment of a liquid separation unit.

As illustrated in FIG. 6, all liquids recovered from the solvent washing process are transferred to a water/oil separator unit. This stream of liquids consists of water, water solubles (including a portion of the polar solvent), solvent, and extracted hydrocarbon oils. The stream is subjected to a clarification and separation process, as illustrated in FIG. 8. First, the liquid stream is transferred to a liquid fraction collection tank. The liquids are then subjected to a clarification process to remove any foreign substances that may be present in the liquids from the solvent wash units. These substances may include dirt, particles of woody tree material from the extraction process, or any other solid substances present in the liquids. Alternatively, these foreign substances may be removed from the liquids through filtration.

Next, water and oil solubles are separated. In a preferred embodiment, separation is achieved via centrifugation. In another preferred embodiment, an array of multiple centrifuges is employed such that a continuous separation operation is utilized. The liquid stream to be centrifuged is comprised of two phases. The first phase is an organic or lipophilic phase comprising the solvent and the extracted hydrocarbon oils. The second phase is an aqueous or hydrophilic phase comprising water and water solubles extracted from the woody tree material. Following the centrifugation process, the two phases are separated into two separate streams, respectively. The aqueous stream comprises a waste water stream. The organic stream is further processed in a distillation unit.

Figure 9:
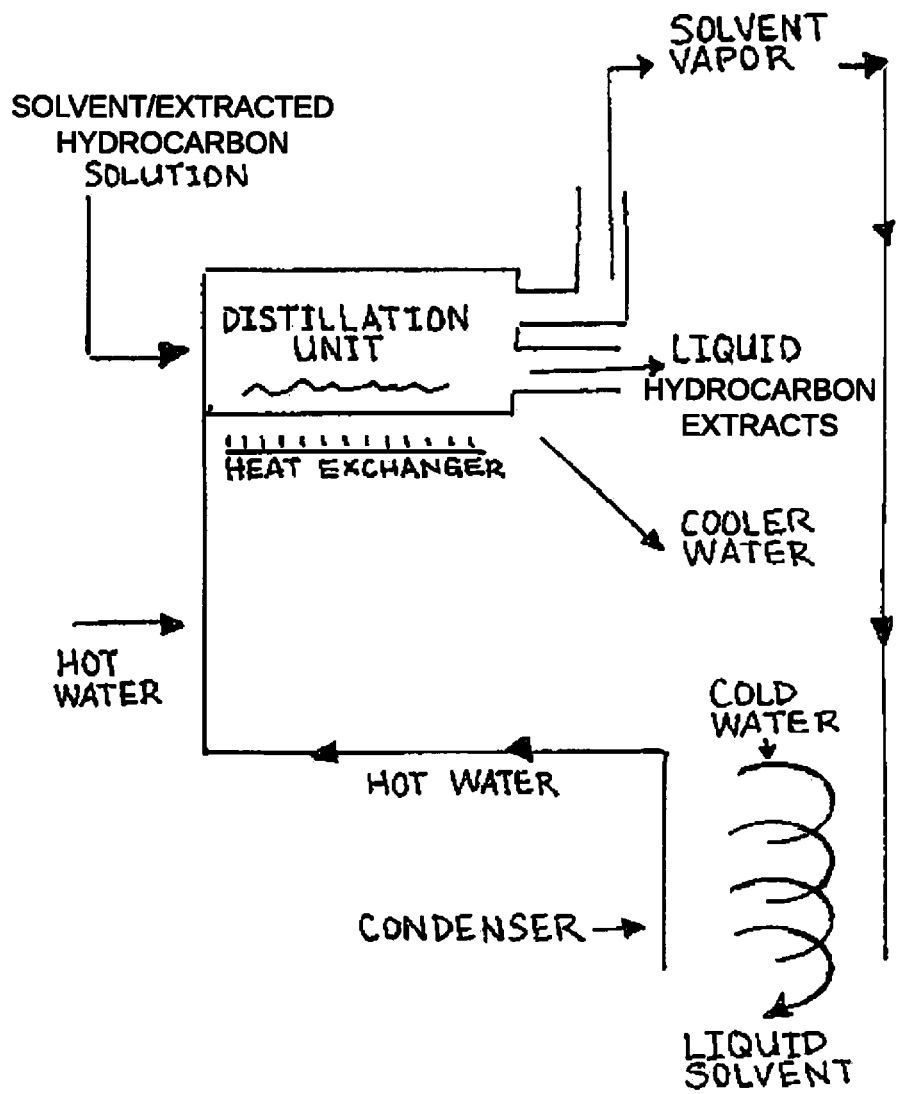
FIG. 9 is a high-level schematic diagram of a preferred embodiment of a distillation and solvent recovery unit.

As illustrated in FIG. 9, the organic-phase solution of solvent and extracted hydrocarbon oils is transferred to the distillation unit in order to separate the extracted hydrocarbon oils from the solvent to produce the final product, which is the solvent extract. After separation, the solvent is recovered and reused in the extraction process.

The solution of hydrocarbons enters the distillation unit and is heated. In order to separate hexane solvent from the extracted hydrocarbons, the solution is heated to a temperature of about 70 to 80 degrees Celsius at approximately atmospheric pressure. Under these conditions, the hexane solvent will boil while the extracted hydrocarbons will remain in a liquid state. In a hydrocarbon solution as produced in the present invention, which further comprises a polar solvent comprised of acetone or ethanol, a lower temperature may be used. In some cases, the solution may be heated to a temperature of around 40 to 50 degrees Celsius, though a higher temperature may be required depending on the relative concentrations of non-polar and polar solvents. This range may be below the boiling point of the polar solvent due to a positive azeotropic interaction between the hexane and the acetone or ethanol, which can lower required energy inputs. The solvent vapors are then condensed and reused in the solvent extraction process. If different solvents are employed, the operating temperature and pressure of the unit may be changed in order to optimize separation.

This unit is a simple distillation/evaporation unit that only separates the solvent from the heavier extracted hydrocarbons, which is the final product. If desired, the extracted hydrocarbons may then be further refined and processed in a fractional distillation unit in order to separate the solution of extracted hydrocarbons into its constituent fractions.

Figure 10:
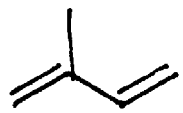
FIG. 10 depicts common chemical subunits that comprise chemical compounds found in the solvent extract.
Figure 10:
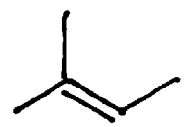
Figure 10:
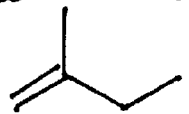

This method is most effective when applied to woody hydrocarbon-bearing trees or shrubs capable of producing significant quantities of liquid terpenes. In the preferred embodiment wherein the method is applied to pine or *eucalyptus* woody tree material, the resulting solvent extract is generally comprised of hydrocarbons having relatively low molecular weights. The hydrocarbons found in woody tree material of these species are mainly comprised of oligomerized pentenes. The subunits of these compounds are mostly comprised of 2-methyl-2-butene, 2-methyl-1-butene, and isoprene (2-methyl-1,3-butadiene), as illustrated in FIG. 10. Because many of the chemical compounds found in the extract are biologically synthesized from pentenes, the number of carbon atoms found in these chemicals is often a multiple of five, although hydrocarbons having odd-numbered carbon atoms, such as heptane, are also common in the extract. The relatively low molecular weight hydrocarbon compounds found in pine and *eucalyptus* tree material have desirable properties for the petroleum industry because they can be further processed into a number of different products, including petroleum fuel, gasoline additives, polymers, or various petrochemical products.

Figure 11:
FIG. 11 depicts chemical compounds commonly found in the naphtha fraction of the solvent extract.
Figure 11:
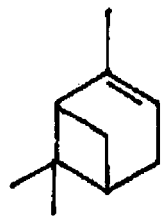
Figure 11:
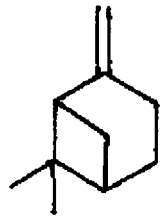

The solvent extract of pine or *eucalyptus* woody tree material is comprised of three fractions: a naphtha fraction, a grease fraction, and a tar fraction. The fraction having the lowest boiling point is the naphtha fraction. This fraction is typically comprised of compounds having ten carbon atoms, though the fraction also includes some compounds having odd-numbered carbon atoms, along with small amounts of compounds having five carbon atoms. As illustrated in FIG. 11, the naphtha fraction is comprised primarily of alpha pinene, beta pinene, and heptane, but also includes various monoterpenes (terpenes having ten carbon atoms) such as limonene, 2,6-dimethyl-2,6-octadiene, and 2,7-dimethyl-2,6-octadiene, as well as other similar pentene oligomers. Pinenes are cyclical monoterpenes comprising turpentine.

The naphtha fraction is the most abundant fraction of the solvent extract and also the most commercially important fraction. The naphtha fraction is the fraction of the solvent extract that primarily serves as a petroleum substitute or feedstock for other petrochemical compounds. The naphtha fraction is a clear to pale yellow liquid with a high vapor pressure. This fraction may include compounds having boiling points that can range from about 30 to 200 degrees Celsius. However, in most instances, the majority of the liquids in the naphtha fraction have a boiling point in the range of about 150 to 180 degrees Celsius. In a preferred embodiment, the majority of the liquids in this fraction have a boiling point of about 150 to 160 degrees Celsius.

Figure 12:
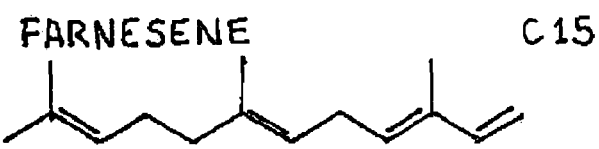
FIG. 12 depicts chemical compounds commonly found in the grease fraction of the solvent extract.
Figure 12:
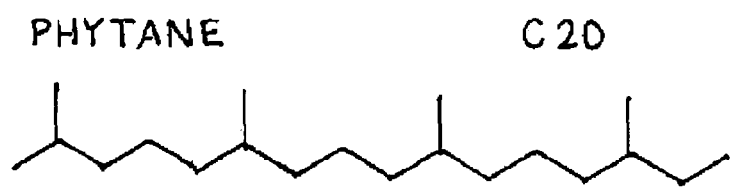
Figure 12:
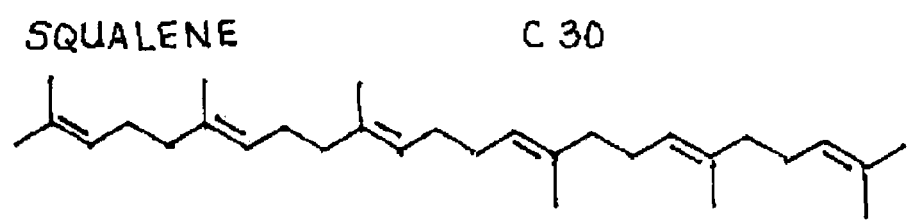

The second fraction is the grease fraction, which is a light to golden brown liquid typically comprised of compounds having thirty carbon atoms, though this fraction may also contain compounds having 25 or 20 carbon atoms, with relatively small amounts of compounds having 15 carbon atoms. The grease fraction is primarily comprised of squalene with lesser concentrations of farnesene and phytane, as illustrated in FIG. 12. The grease fraction will also include any diterpenes (terpenes having twenty carbon atoms) that may be present in the extract, as well as other similar pentene oligomers.

Figure 13:
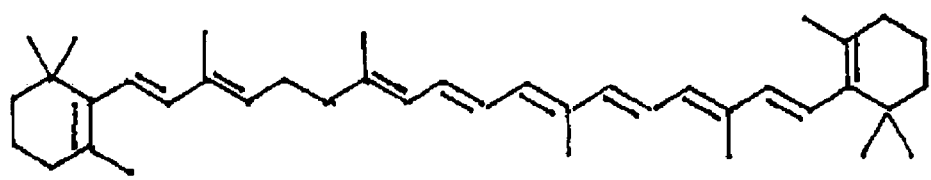
FIGS. 13A and 13B depict chemical compounds commonly found in the tar fraction of the solvent extract.
Figure 13:
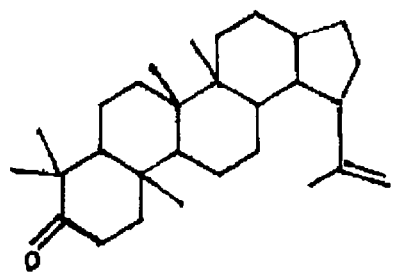
Figure 13B:
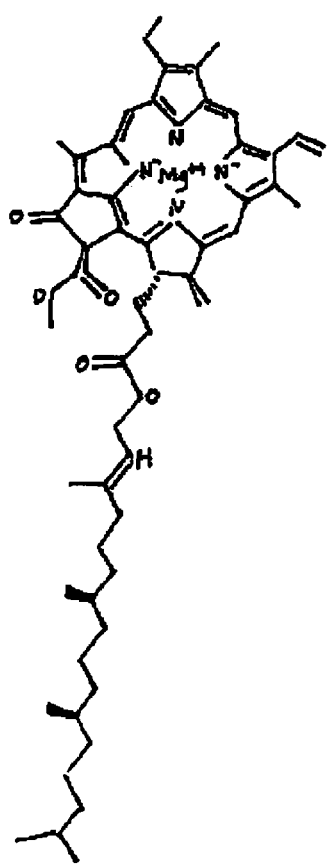

The final fraction, which has the highest boiling point, is the tar fraction. As illustrated in FIGS. 13A and 13B, this fraction is typically comprised of compounds having 35 or more carbon atoms, as well as some compounds having 30 carbon atoms. The tar fraction holds all of the solid and semi-solid hydrocarbons and is usually dark green due to the presence of chlorophyll. This fraction is comprised of rubbers, carotenes, chlorophyll, larger terpenoid molecules, and other similar pentene oligomers. Ketone groups are also present in this fraction in sterols as well as in the chlorophyll. The tar fraction also contains some alcohol compounds.

It is understood that versions of the invention may come in different forms and embodiments. Additionally, it is understood that one of skill in the art would appreciate these various forms and embodiments as falling within the scope of the invention as disclosed herein.

What is claimed is:

1. A method of producing a petroleum substitute by extracting naturally occurring hydrocarbons from woody tree material, said method comprising the steps of:
   a. preparing a plurality of solvent-permeable wood particles by applying compressive and shearing forces to a raw biomass of the woody tree material;
   b. extracting hydrocarbons from the biomass of woody tree material by contacting the wood particles with a solution of organic solvents comprising at least one non-polar organic solvent and at least one polar organic solvent;
   c. recovering a mixture comprised of the solvents and the extracted hydrocarbons; and,
   d. separating the extracted hydrocarbons from the solvents to produce the extract.

2. The method of claim 1, wherein the woody tree material is comprised of at least a portion of a tree in the Pinaceae family.

3. The method of claim 2, said tree of the Pinaceae family comprising a pine tree.

4. The method of claim 1, wherein the woody tree material is comprised of at least a portion of a tree in the Myrtaceae family.

5. The method of claim 4, said tree of the Myrtaceae family comprising a *eucalyptus* tree.

6. The method of claim 1, wherein the non-polar solvent is hexane and the polar solvent is acetone or ethanol.

7. The method of claim 1, further comprising the step of contacting the solvent-saturated wood particles with only a polar organic solvent following the hydrocarbon extraction step, said polar organic solvent being the same polar organic solvent present in the solution of organic solvents.

8. The method of claim 1, wherein the naturally occurring hydrocarbons are comprised of alpha pinene and beta pinene.

9. The method of claim 1, wherein the woody tree material is comprised of logs, limbs, tree barks, or leaves.

10. The method of claim 1, wherein the compressive and shearing forces are comprised of forces applied by wood chipping equipment.

11. The method of claim 1, wherein the wood particles are contacted with the solution of non-polar and polar organic solvents by conveying the wood particles in a countercurrent direction to a flow of the organic solvent solution.

12. The method of claim 11, wherein the countercurrent movement between the wood particles and the solvent solution is a continuous system.

13. The method of claim 11, wherein the organic solvent solution is comprised of a solution of hexane and either acetone or ethanol.

14. The method of claim 1, wherein the extracted hydrocarbons are separated from the solvents by distillation or evaporation.

15. The method of claim 1, further comprising the step of recovering any solvent remaining in the wood particles following the hydrocarbon extraction step.

16. The method of claim 15, wherein solvent is recovered from the wood particles by evaporation.

17. A method of producing a petroleum substitute by extracting naturally occurring hydrocarbons from woody tree material, said method comprising the steps of:
   a. preparing a plurality of solvent-permeable wood particles by using wood chipping equipment to apply compressive and shearing forces to a raw biomass of the woody tree material;
   b. extracting hydrocarbons from the biomass of woody tree material by conveying the wood particles in a countercurrent direction to a flow of an organic solvent solution comprising at least one non-polar organic solvent and at least one polar organic solvent;
   c. recovering liquids from the hydrocarbon extraction step, said liquids having an organic phase and an aqueous phase, the organic phase comprised of solvent and extracted hydrocarbons, and the aqueous phase comprised of water extracted from the woody tree material;
   d. separating the organic phase and the aqueous phase by centrifugation; and,
   e. separating the extracted hydrocarbons in the organic phase from the solvent by distillation or evaporation.

18. The method of claim 17, wherein the woody tree material is comprised of at least a portion of a pine or *eucalyptus* tree.

19. The method of claim 17, wherein the non-polar solvent is hexane and the polar solvent is acetone or ethanol.

20. The method of claim 17, further comprising the step of conveying the solvent-saturated wood particles in a countercurrent direction to a flow of only a polar organic solvent following the hydrocarbon extraction step, said polar organic solvent being the same polar organic solvent present in the solution of organic solvents.

21. The method of claim 17, further comprising the step of clarifying and filtering the liquids recovered from the hydrocarbon extraction step before the step of separating the organic and aqueous phases.

22. The method of claim 17, further comprising the step of recovering any solvent remaining in the wood particles following the hydrocarbon extraction step.

23. The method of claim 22, wherein solvent is recovered from the wood particles by evaporation.

24. The method of claim 17, wherein the naturally occurring hydrocarbons are comprised of alpha pinene and beta pinene.

25. The method of claim 17, wherein the woody tree material is comprised of logs, limbs, tree barks, or leaves.

26. A method of producing a petroleum substitute by extracting naturally occurring hydrocarbons from pine or *eucalyptus* woody tree material, or any combination thereof, comprised of logs, limbs, tree barks, or leaves, using a solution of at least two organic solvents, said method comprising the steps of:
  a. preparing a plurality of solvent-permeable wood particles by using wood chipping equipment to apply compressive and shearing forces to a raw biomass of the pine or *eucalyptus* tree material;
  b. extracting hydrocarbons from the biomass of woody tree material by conveying the wood particles in a countercurrent direction to a flow of an organic solvent solution, said organic solvent solution comprising at least one non-polar solvent comprised of hexane and at least one polar solvent comprised of acetone or ethanol;
  c. washing the solvent-saturated wood particles by conveying the solvent-saturated wood particles in a countercurrent direction to a flow of only a polar organic solvent comprised of acetone or ethanol;
  d. recovering liquids from the hydrocarbon extraction step and the washing step, said liquids having an organic phase and an aqueous phase, the organic phase comprised of solvents and extracted hydrocarbons, and the aqueous phase comprised of water extracted from the woody tree material;
  e. separating the organic phase and the aqueous phase by centrifugation; and,
  f. separating the extracted hydrocarbons in the organic phase from the solvents by distillation or evaporation.

* * * * *